(12) United States Patent
Bengtsson et al.

(10) Patent No.: US 11,968,613 B2
(45) Date of Patent: Apr. 23, 2024

(54) SPECTRUM ACCESS RESTRICTION AND RE-ROUTING OF DATA

(71) Applicant: Sony Group Corporation, Tokyo (JP)

(72) Inventors: Erik Bengtsson, Eslov (SE); Rickard Ljung, Helsingborg (SE); Kåre Agardh, Rydeback (SE); Olof Zander, Sodra Sandby (SE); Fredrik Rusek, Eslov (SE)

(73) Assignee: Sony Group Corporation, Tokyo (JP)

( * ) Notice: Subject to any disclaimer, the term of this patent is extended or adjusted under 35 U.S.C. 154(b) by 365 days.

(21) Appl. No.: 17/295,827

(22) PCT Filed: Nov. 22, 2019

(86) PCT No.: PCT/EP2019/082290
§ 371 (c)(1),
(2) Date: May 20, 2021

(87) PCT Pub. No.: WO2020/109178
PCT Pub. Date: Jun. 4, 2020

(65) Prior Publication Data
US 2022/0015003 A1    Jan. 13, 2022

(30) Foreign Application Priority Data
Nov. 30, 2018   (SE) .................................... 1830351-1

(51) Int. Cl.
*H04W 40/22*   (2009.01)
*H04L 45/24*   (2022.01)
(Continued)

(52) U.S. Cl.
CPC ............. *H04W 40/22* (2013.01); *H04L 45/24* (2013.01); *H04W 40/12* (2013.01); *H04W 40/28* (2013.01)

(58) Field of Classification Search
CPC .. H04L 5/14; H04L 1/00; H04W 8/18; H04W 16/14; H04W 74/0816; H04W 72/0453; H04W 72/51; H04B 7/08
See application file for complete search history.

(56) References Cited

U.S. PATENT DOCUMENTS

| 2006/0203828 | A1 | 9/2006 | Kumazawa |
| 2013/0188542 | A1 | 7/2013 | Merlin |

(Continued)

FOREIGN PATENT DOCUMENTS

| CN | 102428661 A | 4/2012 |
| CN | 105432107 A | 3/2016 |

(Continued)

OTHER PUBLICATIONS

International Search Report and Written Opinion from corresponding International Patent Application No. PCT/EP2019/082290, dated Feb. 18, 2020, 11 pages.

(Continued)

*Primary Examiner* — Iqbal Zaidi
(74) *Attorney, Agent, or Firm* — Tucker Ellis LLP

(57) ABSTRACT

A method includes receiving (3006) at least one report signal (813) from at least one relay node (103, 104, 400), the at least one report signal (813) being associated with a plurality of communication links (111-115) formed by a first node (101, 400), a second node (102, 400), and the at least one relay node (103, 104, 400). The method also includes determining (3007) a multi-hop transmission path (192) for communication between the first node (101, 400) and the second node (102, 400) using communication links (111, 112) selected from the plurality of communication links (111-115), based on the at least one report signal (813) and a spectrum access restriction of a spectrum access of the first node (101, 400).

20 Claims, 7 Drawing Sheets

(51) Int. Cl.
*H04W 40/12* (2009.01)
*H04W 40/28* (2009.01)

(56) References Cited

U.S. PATENT DOCUMENTS

| | | | |
|---|---|---|---|
| 2014/0080535 A1* | 3/2014 | Gauvreau | H04W 16/14 |
| | | | 455/513 |
| 2016/0192439 A1 | 6/2016 | Phuyal | |
| 2016/0242031 A1* | 8/2016 | Ojanen | H04L 5/0064 |
| 2018/0006961 A1 | 1/2018 | Guibene | |
| 2018/0302906 A1 | 10/2018 | Baldemair | |
| 2019/0349426 A1* | 11/2019 | Smith | H04L 67/1093 |

FOREIGN PATENT DOCUMENTS

| | | |
|---|---|---|
| CN | 103052132 B | 5/2017 |
| CN | 107113689 A | 8/2017 |
| CN | 107409345 A | 11/2017 |
| CN | 107534980 A | 1/2018 |
| JP | 2005033340 A | 2/2005 |
| KR | 20180090179 A | 8/2018 |
| WO | 2016192761 A1 | 12/2016 |
| WO | 2018073785 A1 | 4/2018 |
| WO | WO-2018096839 A1 | 5/2018 |

OTHER PUBLICATIONS

Office Action and Swedish Search Report from corresponding Swedish Application No. 1830351-1, dated Jun. 11, 2019, 8 pages.
Yanbo Wang et al,Combination of Spectrum allocation and multi-relay selection in overlay cognitive radio network, «IEEE» Dec. 3, 2015.
Zhang Cui-Zhi et al, Power allocation and subcarrier pairing for AF-OFDM based cognitive radio systems, Journal of Zhejiang University (Engineering Science), No. 12, Dec. 15, 2011.

* cited by examiner

SPECTRUM ACCESS RESTRICTION AND RE-ROUTING OF DATA

TECHNICAL FIELD

Various examples generally relate to communication using transmit time resources of a budget associated with a duty cycle restriction. Various examples specifically relate to determining a multi-hop transmission path based on the duty cycle restriction.

BACKGROUND

Wireless communication is widespread. The number of wireless communication devices (sometimes also referred to as mobile devices or user equipment, UE) is expected to further grow, e.g., as part of a trend referred to as Internet of Things (IOT).

However, resources on the electromagnetic spectrum are limited. Thus, there can be a scenario in which nodes accessing the spectrum compete for access to the spectrum. To mitigate this issue, it has been proposed to also allow access to an open/unlicensed spectrum. When communicating on an open spectrum, a central scheduling service applicable to all nodes accessing the spectrum is not employed; but rather each individual node follows certain regulations that impose restrictions on the spectrum access. One example spectrum access restriction relates to a duty cycle (DC) restriction, e.g., each individual node may not transmit for more than, e.g., 0.1% or 1% or 10% of the time, employing a sliding window approach where the window size is, e.g., one hour long.

In such a situation with an imposed DC restriction, a balance of a budget of transmit time resources (TTRs) associated with the duty cycle restriction can run low. Then, if further data is queued for transmission, a situation can occur where the transmission of the data needs to be postponed until the balance of the budget has recuperated. This can increase a latency in the data transmission. Under certain use cases, such latency can be undesirable, e.g., in view of time-sensitive data, etc.

SUMMARY

A need exists for advanced techniques of communicating in view of spectrum access restrictions. Specifically, a need exists for advanced techniques which overcome or mitigate at least some of the above-identified restrictions and drawbacks.

This need is met by the features of the independent claims. The features of the dependent claims define embodiments.

A method includes receiving at least one report signal from at least one relay node. The at least one report signal is associated with a plurality of communication links formed by a first node, a second node, and the at least one relay node. The method also includes, based on the at least one report signal and a spectrum access restriction of a spectrum access of the first node: determining a multi-hop transmission path for communication between the first node and the second node. The multi-hop transmission path is determined using communication links selected from the plurality of communication links.

A computer program or a computer-program product or a computer-readable storage medium includes program code that can be executed by at least one processor. Executing the program code causes the at least one processor to perform a method.

The method includes receiving at least one report signal from at least one relay node. The at least one report signal is associated with a plurality of communication links formed by a first node, a second node, and the at least one relay node. The method also includes, based on the at least one report signal and a spectrum access restriction of a spectrum access of the first node: determining a multi-hop transmission path for communication between the first node and the second node. The multi-hop transmission path is determined using communication links selected from the plurality of communication links.

A node includes a control circuitry. The control circuitry is configured to receive at least one report signal from at least one relay node, the at least one report signal being associated with a plurality of communication links formed by a first node, a second node, and the at least one relay node. The control circuitry is also configured to determine a multi-hop transmission path for communication between the first node and the second node using communication links selected from the plurality of communication links, based on the at least one report signal and a spectrum access restriction of a spectrum access of the first node.

A method includes receiving at least one report signal from at least one relay node. The at least one report signal is associated with a plurality of communication links formed by a first node, a second node, and the at least one relay node. The method also includes, based on the at least one report signal: determining a multi-hop transmission path for communication between the first node and the second node. The multi-hop transmission path is determined using communication links selected from the plurality of communication links.

A method includes a relay node transmitting, to a node, a report signal. The report signal is associated with a plurality of communication links formed by the relay node and one or more further nodes. The report signal is indicative of a spectrum access restriction of spectrum access of the relay node. The method also includes relaying data along a multi-hop transmission path using transmit time resources from a resource budget associated with the spectrum access restriction.

A computer program or a computer-program product or a computer-readable storage medium includes program code that can be executed by at least one processor. Executing the program code causes the at least one processor to perform a method. The method includes a relay node transmitting, to a node, a report signal. The report signal is associated with a plurality of communication links formed by the relay node and one or more further nodes. The report signal is indicative of a spectrum access restriction of spectrum access of the relay node. The method also includes relaying data along a multi-hop transmission path the report signal.

A relay node includes a control circuitry configured to transmit, to a node, a report signal, the report signal being associated with a plurality of communication links formed by the relay node and one or more further nodes, the report signal being indicative of a spectrum access restriction of spectrum access of the relay node. The control circuit is also configured to relay data along a multi-hop transmission path using transmit time resources from a resource budget associated with the spectrum access restriction.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
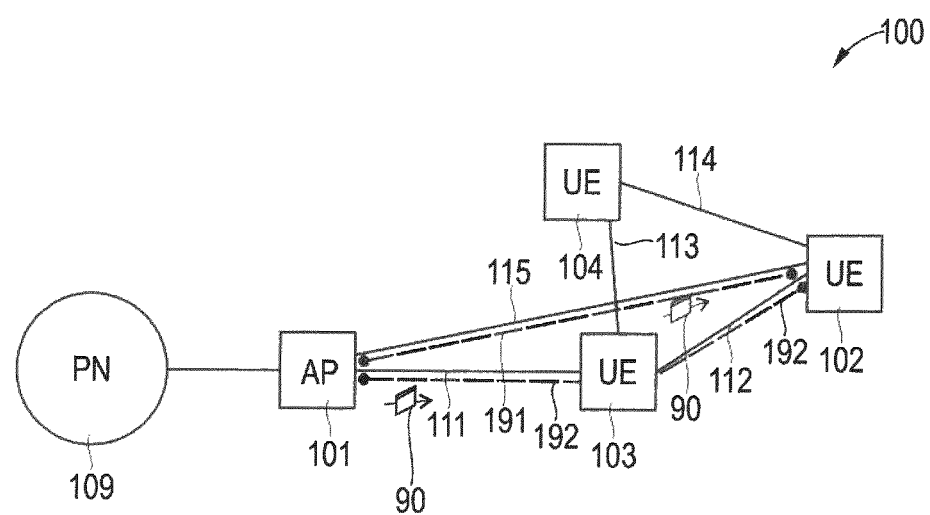
FIG. 1 schematically illustrates multiple communication links formed between multiple nodes according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques are described which facilitate communication between a first node and a second node in view of spectrum access restrictions.

As a general rule, various kinds and types of spectrum access restrictions may be encountered. Typically, each node is associated with a respective spectrum access restriction. For example, the first node may be subject to a first DC restriction and the second node may be subject to a second DC restriction. If the first node transmits a signal on the spectrum, a respective balance associated with the first DC restriction is reduced. Over time, the balance can recuperate if the first node refrains from transmitting.

For example, the spectrum access restriction may impose a certain limitation on a maximum contiguous access time. Thus, a given node may not be allowed to access the spectrum for longer than a certain time duration without intermission. Another spectrum access restrictions is a DC restriction. For sake of simplicity, hereinafter, reference is primarily made to an implementation of the spectrum access restriction as a DC restriction, but the techniques described hereinafter are not limited thereto.

For example, a typical DC restriction may specify a certain time fraction per reference time interval that may be used by a node for transmitting on the spectrum. For example, a typical duration of the reference time interval can be in the order of minutes or hours. For example, a typical time fraction can be in the order of 0.1% to 10%. For instance, the DC restriction can be implemented in terms of TTRs. Each node may have a budget of TTRs that is determined based on the DC restriction. Then, when the node transmits using TTRs, the balance of the budget is reduced. The balance shall not fall below zero, to avoid violation of the DC restriction. The particular implementation of the DC restriction is not germane for the functioning of the techniques described herein. Rather, the techniques described herein can be flexibly applied to various implementations of the DC restriction.

Various techniques described herein may be applied in connection with communication on an open spectrum. Here, a central scheduling service may not be available. Rather, each node attempting to access the spectrum may have to employ a listen-before-talk (LBT) procedure. Here, channel sensing may be employed to determine an average power on the spectrum; if the average power exceeds a threshold, the node attempting to access the spectrum may postpone transmission by a back-off time duration. This contrasts with a regulated spectrum where the central scheduling service is a centralized authority that proactively distributes resources to the various participating nodes.

Various techniques described herein relate to a scenario in which multiple nodes accessing a spectrum form a network. In other words, the multiple nodes can communicate with each other using predefined rules. The multiple nodes can exchange data. For example, the network may include one or more APs. The network may include one or more UEs. The one or more APs may provide the one or more UEs with access to one or more data networks such as packet data networks or even circuit-switched telecommunication networks.

For example, one or more communication links can be formed between the nodes accessing the spectrum. A communication link can include one or more frequency bands; carrier aggregation could be employed. A communication link can implement one or more channels, e.g., a random-access channel, a payload channel, and a control channel. A communication link can be characterized with one or more transmit properties such as transmit power, modulation scheme, coding scheme, coverage extension repetition level, etc. Different communication links can employ the same or different protocols. It is generally not required that all communication links operate according to the same protocol. For example, a first communication link may operate according to the Third Generation Partnership Project (3GPP) Long Term Evolution (LTE) protocol, while a second communication link may operate according to the 3GPP New Radio (NR) protocol. Further example protocols include: Bluetooth, Wi-Fi, etc. For example, the protocols of the various communication links can differ with respect to at least one of carrier frequency, modulation scheme, and coding scheme. Device-to-device (D2D) communication, sometimes also referred to as sidelink communication, may be employed. Furthermore, it is possible that one or more of the communication links are not associated with a DC restriction.

Various techniques described herein are based on the finding that in some scenarios one or more of the nodes accessing the spectrum may have an insufficient balance of the budget associated with the respective DC restriction. For example, there may be more data queued for transmission then can be accommodated by the balance. Such scenarios may be particularly applicable for APs. The reason for this is that APs typically must communicate with many UEs such that the overall amount of TTRs required by an AP can be comparably large. Various examples described herein facilitate mitigation of such an insufficient balance associated with the DC restriction.

According to various examples described herein, when a first node—such as an AP—realizes that its balance of available TTRs is insufficient to support the amount of data queued for transmission, a certain countermeasure may be taken. For example, the first node may be engaged in a communication with a second node (generally, the first node may be engaged in multiple communications with multiple nodes, but for sake of simplicity the following explanation is given for the communication between the first node and the second node and similar techniques may be readily extended to further communications with further notes). For example, the second node may be a UE.

For example, the first node may make a predictive determination of an insufficient balance of the budget associated with the DC restriction. To do so, the first node may take into account a data buffer level related to the amount of data to transmit, coverage extension level, a coding scheme, a modulation scheme, and/or a number of nodes it has to communicate with, etc. To illustrate this, there can be a situation where the link quality of a particular communication link on which the first node transmits is low. Such a weak communication link typically requires a larger amount of TTRs to accommodate for the same data due to lower spectral efficiency. To give an example, a coverage extension level may be set to a larger value for a weak communication link: the coverage extension level can define the number of repetitions of transport blocks on a physical layer 1 so that the receiver can combine the respective signals in the baseband representation before attempting to decode. For example, while a strong link may have a coverage extension level of 10 (i.e., 10 repetitions of a transport block), a weak link may have a coverage extension level of 1000 (i.e., 1000 repetitions of a transport block). Hence, the weak communication link in this example requires a factor of 100 more TTRs to successfully transmit the data. This can heavily affect the balance of the budget associated with the DC restriction. A similar correlation between the amount of TTRs also exists for the coding scheme and the modulation scheme. For example, the coding scheme may require a larger number or redundancy bits to be transmitted and/or a longer error correction checksum for weaker links. For example, the modulation scheme may require a lower constellation for weaker links.

In view of such a situation, it is possible that the first node request one or more of its neighboring nodes to discover and report communication links to their respective neighboring nodes. This can help to discover neighboring nodes that are willing to forward data. Such nodes are referred to as relay nodes, hereinafter.

It is then possible for the first node to determine an appropriate multi-hop transmission path including one or more relay nodes, based on discovered communication links. The multi-hop transmission path includes two or more communication links. The multi-hop transmission path includes two or more relay nodes. The multi-hop transmission link terminates at the first node and at the second node.

There may be multiple multi-hop transmission paths available that terminate at the first node and the second node and that are, hence, suitable candidates for the communication. Different multi-hop transmission paths may be along different relay nodes. As a general rule, there are various decision criteria are conceivable for selecting the appropriate multi-hop transmission path from the candidates. For example, a priori knowledge, e.g., a prioritization of relay nodes or a preferred transmission protocol may be employed to determine the appropriate multi-hop transmission path. It would also be possible to employ an optimization. For example, the optimization may have a goal function that minimizes the spectrum access at the first node. As a more general rule, the relay nodes may provide report signals that can be indicative of one or more information elements associated with the relay nodes and/or the respective communication links. Then, the appropriate multi-hop transmission path can be determined based on the report signals.

By using the multi-hop transmission path, the first node can consume fewer TTRs by relaying signals through one or more relay nodes and along multiple communication links with an overall better spectral efficiency. For instance, using the above-mentioned example of a coverage extension level: while the direct single-hop communication path comprises a communication link that has a coverage extension level of 1000, it would be possible that the multi-hop communication path comprises two communication links that each have a coverage extension level of 10. Then, the total amount of TTRs can be strongly reduced when employing the multi-hop communication path.

Next, a specific example of a process flow is given: a control signal transmitted by the first node can trigger one or more relay nodes to scan for communication links to one or more other relay nodes and/or the first node and/or the second node (discovery). For example, discovery beacon signals may be broadcasted. The one or more relay nodes can then transmit a signal which is indicative of the discovered nodes in their vicinity, associated radio parameters (e.g., spectral efficiency, interference, and available TTRs), and/or other device-related parameters (e.g., a mobility, a battery status, a power supply status, etc.). The one or more relay nodes may report their capabilities, e.g., whether they support relaying, which wireless protocols they support, the power classes and supported data rates. The one or more relay nodes may report on a security level and/or encryption level that they use. Such information may be used to make an informed determination of the multi-hop transmission path at the first node.

FIG. 1 schematically illustrates aspects with respect to multiple wireless communication links 111-115 formed between multiple nodes 101-104.

In the example of FIG. 1, the nodes 101-104 form a network 100. There is an AP 101 and UEs 102-104. Since the nodes 101-104 access an open spectrum, the AP 101 does not provide a scheduling functionality to the UEs 102-104, at least when communicating on the open spectrum. In the example of FIG. 1, the AP 101 provides access to a packet network 109 by means of a backbone connection.

As illustrated in FIG. 1, the AP 101 and the UE 102 communicate along a direct single-link transmission path 191. The direct single-link transmission path 191 is implemented on the communication link 115 established by the AP 101 and the UE 102. In FIG. 1, data 90 transmitted by the AP 101 and received by the UE 102 is communicated along the direct single-link transmission path 191 (it would be possible that further data, not illustrated in FIG. 1, is transmitted by the UE 102 and received by the AP 101 along the direct single-link transmission path 191—which can, thus, be bi-directional).

While in FIG. 1 only the transmission of the data 90 from the AP 101 to the UE 102 is illustrated, it is generally possible that various nodes 101-104 of the network 100 exchange data with each other.

In FIG. 1, an alternative routing for the data 90 from the AP 101 to the UE 102 is illustrated. In FIG. 1, the alternative routing for the data 90 is along a multi-hop transmission path 192. Again, the multi-hop transmission path 192 terminates at the AP 101 and the UE 102. The multi-hop transmission path 192 includes the UE 103 which provides relay functionality. As such, the UE 103 can be referred to as a relay UE 103. The multi-hop transmission path 192 includes the communication links 111 and 112.

Hereinafter, techniques are described which facilitate selecting an appropriate routing for the data 90. According to the techniques described herein, it would be possible to determine an appropriate multi-hop transmission path for the communication between the AP 101 and the UE 102 (e.g., considering that in the above-described example there are various multi-hop transmission paths that terminate at the AP 101 and the UE 102, e.g., also the multi-hop transmission path formed by the communication links 111, 113, 114).

Alternatively or additionally, according to the techniques described herein, it would also be possible to select between one or more multi-hop transmission paths and a direct single-hop transmission path for the communication.

According to various techniques described herein, an appropriate multi-hop transmission path is determined based on a DC restriction of a transmitting node.

Optionally, it is also possible to take into account report signals received from one or more relay nodes that are candidates for implementing the multi-hop transmission path.

Figure 2:
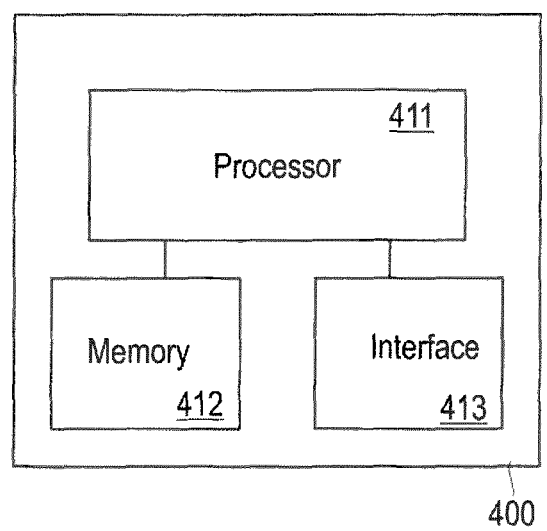
FIG. 2 schematically illustrates a node according to various examples.

FIG. 2 schematically illustrates a node 400. For example, the node 400 as illustrated in FIG. 2 could implement the AP 101 or any one of the UEs 102-104 of FIG. 1.

The node 400 includes a processor 411, e.g., a central processing unit or a graphics processing unit or a field-programmable gated array or an application-specific integrated circuit. The node 400 also includes a memory 412. For instance, the memory 412 may include a volatile part and a non-volatile part. For example, the memory 412 may include a random access memory and a flash memory, or the like. The memory 412 can store program code that can be loaded and executed by the processor 411. As such, the processor 411 and the memory 412 can implement a control circuitry. The node 400 also includes an interface 413. The interface 413 can be a wireless interface and may include an analog front end and a digital front end. The interface 413 may include one or more antennas. Using the interface 413, transmitting and/or receiving (communicating) on a wireless link is possible.

When the processor 411 executes the program code stored in the memory 412, it can perform one or more of the following functions: communicating on a single-hop transmission path with another node; determining a multi-hop transmission path to the another node; communicating with the another node on the multi-hop transmission path; when determining the multi-hop transmission path, taking into account one or more decision criteria such as: a DC restriction of the node, a current balance of a budget associated with the DC restriction of the node, a DC restriction of one or more relay nodes along the multi-hop transmission path and/or a balance of a budget of a DC restriction thereof, one or more device operational parameters of the one or more relay nodes, one or more link qualities of communication links along the multi-hop transmission path, one or more protocol types of the communication links along the multi-hop transmission path; relaying data along a multi-hop transmission path; managing a budget associated with a DC restriction; etc.

Figure 3:
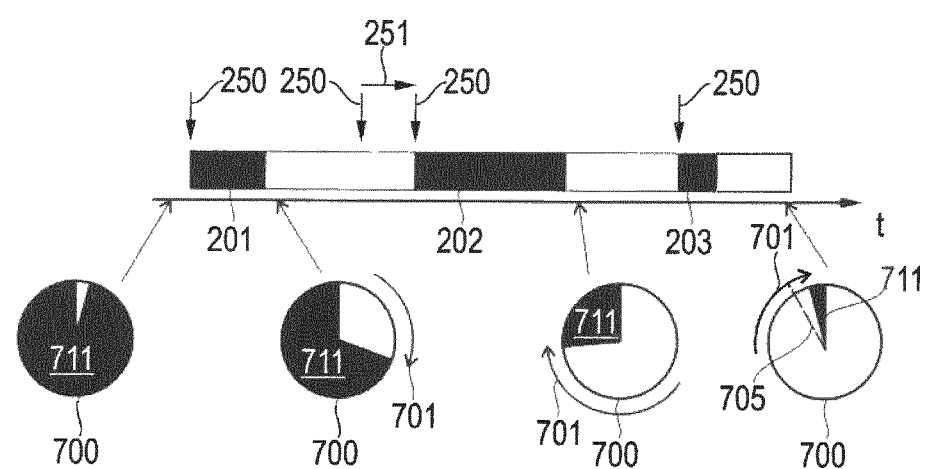
FIG. 3 schematically illustrates use of TTRs and a corresponding balance of a budget associated with a DC restriction according to various examples.

FIG. 3 schematically illustrates aspects with respect to spectrum access by the AP 101. While FIG. 3 illustrates spectrum access by the AP 101, similar techniques may also be applied for spectrum access by any one of the UEs 102-104.

FIG. 3, top, illustrates transmission intervals 201-203 during which the AP 101 accesses the spectrum. As illustrated in FIG. 3, the AP 101 does not access the spectrum contiguously. This restriction on the spectrum access is due to a DC restriction imposed on the AP 101.

In the example of FIG. 3, each time before accessing the spectrum, the AP 101 performs an LBT procedure 250. The LBT procedure 250 is optional. The purpose of the LBT process 250 as to avoid collision between two nodes 101-104 attempting to access the spectrum contemporaneously. For the transmission intervals 201-203, the respective LBT procedure 250 succeed. For example, a respective spectral power density may remain below a predefined threshold. There is one LBT procedure 250 illustrated in FIG. 3, in between the transmission intervals 201, 202, that fails. The failing LBT procedure 250 triggers a back-off time duration 251 after which a subsequent LBT procedure 250 is performed. The LBT procedure 250 is generally optional.

FIG. 3 also illustrates aspects with respect to a budget 700 associated with the DC restriction. The AP 101 manages the budget 700. For example, this involves counting the use of TTRs during the transmission intervals 201-203 to update a balance 711 of the budget 700. This also includes monitoring that the balance 711 of the budget 700 does not reach zero or fall below zero.

In the example of FIG. 3, a pie chart is used to graphically illustrate a balance 711 of the budget 700. In the pie chart, the black part is associated with available, un-used TTRs— corresponding to the available balance 711; while the white part is associated with non-available, already used TTRs.

In FIG. 3, four instances of the pie chart illustrating the budget 700 are shown, for four different points in time. Initially, the balance 711 is high, i.e., they are many available TTRs. Then, for each of the transmission time interval 201-203, the balance 711 is reduced, i.e., a certain part 701 of the budget 700 is used for implementing the respective transmission intervals 201-203. The part 701 correlates with the amount of used TTRs. Such mapping of used and un-used TTRs to a balance of a budget is an example implementation. There are various other mappings available and the techniques described herein may be modified accordingly.

As a general rule, it is possible that depending on the transmit property—e.g., coding scheme, coverage extension repetition level, modulation scheme, frequency, forward error correction, and/or transmit power—the same amount of data requires more or fewer TTRs.

As illustrated in FIG. 3, the balance 711 eventually falls below a threshold 705. Then, according to reference implementations, the AP 101 may refrain from further spectrum access for a certain time duration until the balance 711 has recuperated. The AP 101 may refrain from spectrum access depending on the balance 711 value compared to the amount of data it currently needs to transmit. Hereinafter, techniques are described that overcome or mitigate such a delay in transmission. Example methods are described in connection with FIG. 4 and FIG. 5.

Figure 4:
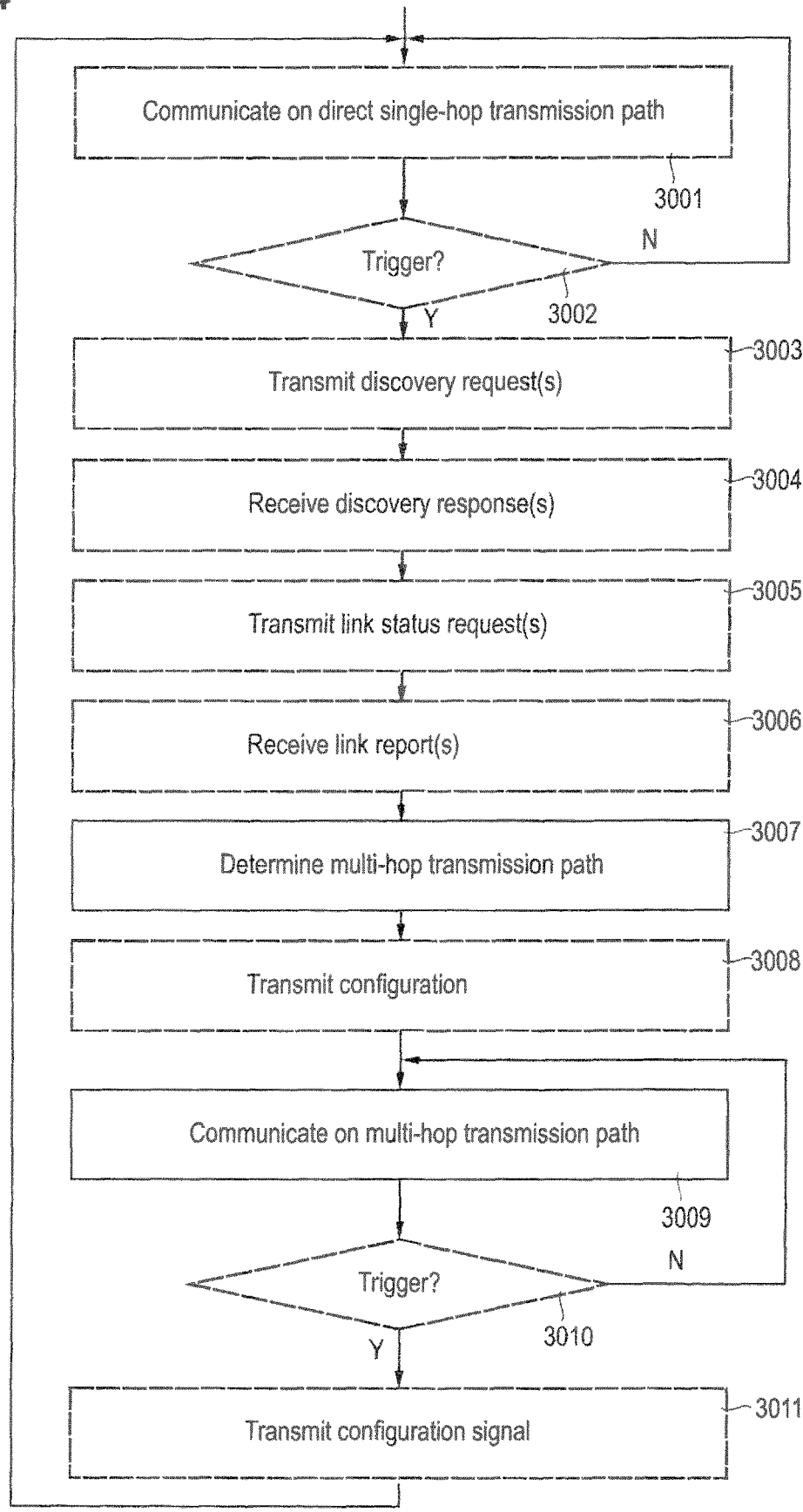
FIG. 4 is a flowchart of a method implemented by a transmitting node according to various examples.

FIG. 4 is a flowchart of a method according to various examples. Optional blocks are illustrated with dashed lines in FIG. 4. The method of FIG. 4 can be executed by a first node. The first node may be a transmitting node. For example, the first node may be configured as the node 400 in FIG. 2; as such, the method of FIG. 4 may be executed by the processor 411 and the memory 412 of the node 400 as illustrated in FIG. 2. Specifically, it would be possible that the method of FIG. 4 is executed by the AP 101 of a network 100 is illustrated in FIG. 1.

The method starts with block 3001. In block 3001 a communication on a direct single-hop transmission path between the first node and a second node is implemented. The second node implements a receiving node; e.g., the second node could be the UE 102 in FIG. 1.

Block 3001 can include the first node transmitting data or, even more generally, the first node accessing the spectrum. Specifically, the first node can transmit one or more signals that encode the data. Block 3001 can also include the first node managing a budget associated with a DC restriction (here, techniques as explained above in connection with FIG. 3 for the AP 101 managing the budget 700 can be employed).

Next, in block 3002, it is checked whether one or more trigger criteria are met. The one or more trigger criteria of block 3002 are associated with re-routing the data along a multi-hop transmission path.

As a general rule, various trigger criteria are conceivable for an implementation of block 3002. To give an example: it would be possible that the first node monitors fulfilment of the DC restriction when communicating using the direct single-hop transmission path. Fulfilment of the DC restriction can correspond to not overdrawing the balance of the budget. Then, re-routing can be selectively triggered based on said monitoring of the fulfilment, e.g., if under-fulfilment is impending.

For instance, monitoring fulfilment may include comparing the available TTRs specified by a balance of a budget associated with the DC restriction with a predefined threshold (cf. FIG. 3: threshold 705). Specifically, monitoring fulfilment can also be implemented prospectively, e.g., by predicting use of TTRs by the first node for the communication with the second node using the direct single-hop transmission path. For example, the use can predicted for a certain prediction time interval. The prediction time interval may be associated with a required latency of the data to be transmitted. For example, the use could be predicted for data queued for transmission in a transmit buffer. Then, it would be possible that the predicted use of the TTRs is compared with a threshold associated with the DC restriction.

If, in block 3002, the trigger criterion is not met, then the communication continued to be implemented using the direct single-hop transmission path, by re-executing block 3001. Otherwise, if the trigger criterion is met, the method commences with block 3003.

In block 3003, a control signal is transmitted. The control signal triggers discovery and may, hence, be referred to as discovery request. For example, the discovery request may be broadcasted. It would be possible that one or more discovery requests are transmitted to one or more nodes in the vicinity of the first node. For example, the one or more discovery requests could be transmitted to one or more UEs and/or one or more other APs.

The one or more discovery requests can trigger second nodes to perform a discovery of available communication links. In other words, the one or more discovery requests can trigger a discovery procedure. A result of one or more such discovery procedures is then received in block 3004, i.e., response signals are received that may also be referred to as discovery responses.

In block 3004, one or more discovery responses are received from one or more nodes in the vicinity of the first node. The one or more discovery responses are indicative of one or more communication links that are accessible by the one or more nodes in the vicinity of the first node. To give an example, based in FIG. 1: for example, the UE 103 may transmit a discovery response that is indicative of the communication links 111-113, all of which terminate at the UE 103.

As a general, the various implementations conceivable regarding how to indicate the communication links in the discovery response(s). One possibility would be that identities and/or routing addresses of the terminating nodes of the communication links are included in the discovery responses.

Then, at block 3005, one or more report requests are transmitted to at least one of the nodes in the vicinity that provided the discovery response. For example, the link status requests could be transmitted based on a decision-making process taking into account the one or more discovery responses. For example, "dead-end" nodes may not be addressed using a link status request: such nodes may not offer a path from the first node to the second node.

The report requests may trigger provisioning one or more report signals (or simply reports). Thus, at block 3006, the one or more reports are received. Based on the one or more reports, the first node, at block 3007, determines a multi-hop transmission path for the communication with the second node. In this determination, the first node generally also takes into account its DC restriction.

As a general rule, there are various options available for (i) taking into account the DC restriction of the first node; and there are also various options available for (ii) taking into account the one or more reports when determining the multi-hop transmission path. Hereinafter, a couple of examples of this decision-making process are explained.

Regarding the DC restriction entering the decision-making process for determining the multi-hop transmission path: here, it would be possible that the DC restriction is taken into account by selectively triggering the determination of the multi-hop transmission path if the available TTRs indicated by the balance of the budget associated with the DC restriction falls below a threshold (as explained above in connection with block 3002, as well as in connection with FIG. 3: threshold 705). Alternatively or additionally, it would be possible that the DC restriction is taken into account by selectively triggering the determination of the multi-hop transmission path if the DC restriction is active. In other words, if the DC restriction is deactivated, then the multi-hop transmission path may not be determined and re-routing may not be required; however, if the DC restriction is activated, then the multi-hop transmission path may be determined, e.g., irrespective of the running total of the balance associated with the DC restriction.

Regarding the one or more reports entering the decision-making process for determining the multi-hop transmission path: as a general rule, the one or more reports can have varying information content depending on the particular implementation. Hereinafter, a few examples of possible implementations of the one or more reports are given and the respective decision-making process is illustrated.

In a first example, it would be possible that the one or more reports are indicative of one or more further DC restrictions of spectrum access of the respective nodes. Then, it would be possible that the multi-hop transmission path is determined based on the one or more further DC restrictions. To give an example, it would be possible that the one or more reports are indicative of activation or deactivation of the one or more further DC restrictions. Hence, it would be possible to determine the multi-hop transmission path to only include relay nodes that are not subject to a DC restriction, i.e., for which the DC restriction is deactivated. To give a further example, it would be possible that the one or more reports are indicative of a balance of a budget associated with the one or more further DC restrictions of spectrum access of the one or more relay nodes. For instance, it would be possible that the one or more reports are indicative of the available TTRs. Then, it would be possible that the multi-hop transmission path is determined to include relay nodes that have a sufficient balance.

In a second example, it would be possible that the one or more reports are indicative of one or more link statuses of the communication links. Then, the multi-hop transmission path can be determined based on the one or more link statuses. For instance, the link statuses can include information elements that are selected from the group including: a repetition level for coverage extension; a receive signal strength of a pilot signal transmitted along the respective communication link; a channel quality indicator; a spectral efficiency of communicating on the respective communication link; a data rate of communicating on the respective communication link; an interference level of communicating on the respective communication link; a security level and/or on encryption of communicating on the respective communication link; and an error rate.

As will be appreciated from the above, such a report indicative of a link status facilitates an estimation on an amount of required TTRs per data unit for transmitting on the respective communication link. Thus, generally speaking, the various examples described herein it would be possible that the multi-hop transmission path is determined based on an estimation of an amount of required TTRs at the one or more relay nodes along the multi-hop transmission path. Also, such a report indicative of the link status facilitates an estimation of a likelihood of success of communicating data along the respective communication link. For example, such communication links may be excluded from the multi-hop transmission path that only offer a limited likelihood of success of communicating data along the respective communication link.

In a third example, it would be possible that the one or more reports are indicative of protocol types of the plurality of communication links. Then, it would be possible that the multi-hop transmission path is determined based on the protocol types. For example, the protocol types may be selected from the group including: 3GPP LTE; 3GPP NR; Wi-Fi; Bluetooth; etc. Thereby, it would be possible to prioritize certain protocols over other protocols when determining the multi-hop transmission path.

In a fourth example, it would be possible that the one or more reports are indicative of one or more operational device parameters of the respective nodes. Here, it would be possible that the one or more operational device parameters are selected from the group including: a mobility of the respective relay node; a battery status of the respective relay node; a power class of the respective relay node; a device type of the respective relay node, e.g., IOT device or Machine Type Communication device or handheld terminal of a user; and a relaying capability of the respective relay node. The relaying capability may be indicative of whether the relay node can offer relaying at all; the relaying capability could also be indicative of an amount of relaying capacity offered by the relay node. For instance, the relaying capability may be indicative of an amount of TTRs that the relay node may offer for relaying. Then, it would be possible that the multi-hop transmission path is determined based on the one or more operational device parameters.

As will be appreciated from the examples given above, there are generally various options available for implementing the reports. Accordingly, there are also various options available for implementing the determination of the multi-hop transmission path based on the reports. Further, the examples mentioned above can be combined with each other to form further examples. Furthermore, further information elements not mentioned in the examples given above may be included in the one or more reports, to form even further examples.

While the input to an algorithm for determining the multi-hop transmission path can vary significantly, e.g., depending on the information content of the report, it is also possible that the algorithm of determining itself varies from implementation to implementation. Next, a few examples of the implementation of the algorithm are given.

In a first example, as mentioned above, it would be possible that the determining of the multi-hop transmission path this based on an estimation of an amount of the required TTRs at one or more relay nodes along the multi-hop transmission path. For example, the multi-hop transmission path may be determined so as to minimize the required TTRs at the one or more relay nodes. For example, such a determination may, in particular, take into account a link status reported by the corresponding node.

In a second example, a predefined prioritization may be applied to provide a ranking between multiple candidate communication links. Then, the multi-hop transmission path may be determined in accordance with the ranking.

In a third example, it would be possible that the determining of the multi-hop transmission path includes an optimization that has a goal function and a constraint. For example, a mixed integer linear optimization may be employed. For example, a simplex algorithm may be employed. For example, a genetic algorithm may be employed. For example, a combinatorial algorithm may be employed.

There are also various implementations conceivable for the formulation of the goal function and the constraint. To give a few examples, it would be possible that the goal function includes one or more terms that are associated with element selected from the group including: use of TTRs at the transmitting node; use of TTRs at one or more relay nodes, e.g., those subject to a DC restriction; a global use of TTRs at all nodes along the multi-hop transmission path; a count of nodes along the multi-hop transmission path; a latency of the communication between the first node and the second node; and amount of control signaling overhead associated with the communication between the first node and the second node. The constraint can include one or more terms that are associated with elements selected from the group including: the balance of the budget associated with the DC restriction at the first node, e.g., the amount of available TTRs; the further balance of the budget associated with the further DC restriction at one or more of the relay nodes along the multi-hop transmission path, e.g., the amount of available transmit resources.

Next, these findings are motivated: for example, while in terms of employed TTRs use of a larger count of relay nodes may be beneficial (i.e., more hops along the multi-hop transmission path), typically, a larger count of relay nodes can increase the latency of the communication between the first node and the second node. Therefore, corresponding objectives may be considered in the goal function. Further, care shall be taken not to violate the DC restrictions at the nodes along the multi-hop transmission path: the DC restrictions can be enforced by taking them into account as part of the constraint. Furthermore, use of TTRs can be optimized both on individual node level, as well as globally on network-level. For example, in a network-level approach, it may be beneficiary to minimize the overall employed TTRs for the entire communication between the first node and the second node. On the other hand, from individual node perspective, it can be beneficiary to minimize the locally employed TTRs. Therefore, it would be possible to take into account corresponding objectives in the goal function. These are just a few examples of possible objectives and other objectives may be possible.

Once the multi-hop transmission path has been determined, the method commences with block 3008. In block 3008, a respective configuration signal is transmitted to one or more of the relay nodes and, optionally, the second node. Specifically, the configuration is transmitted to one or more relay nodes that are along the multi-hop transmission path that has been previously determined. The configuration signal is indicative of a request for relaying data along the multi-hop transmission path. The configuration signal configured the multi-hop transmission path.

This facilitates, in block 3009, the communication of the data along the multi-transmission path. Re-routing is completed.

In block 3010, can be checked whether one or more further trigger criteria are met. The one or more further trigger criteria are associated with undoing the re-routing along the multi-hop transmission path. If the one or more further trigger criteria are not met, then the communication along the multi-hop transmission path continues, by re-executing block 3009. Otherwise, a corresponding configuration can be transmitted to the one or more relay nodes and optionally the second node. This configuration is indicative of a request of stopping said relaying of the data along the multi-hop transmission path. Then, block 3001 is re-executed, i.e., the communication is implemented on the direct single-hop transmission path.

As a general rule, the one or more trigger criteria considered in block 3010 can correspond to the one or more trigger criteria considered in block 3002.

While a certain implementation of the process of re-routing from the single-hop transmission path to the multi-hop transmission path has been explained in connection with the flowchart of FIG. 4, shall be appreciated that other implementations are conceivable. To give a few examples, it would be possible that communication is not initiated on the direct single-hop transmission path. As such, blocks 3001 and 3002 are optional. Further, in some examples, it would be possible that the discovery response and the link report are implemented in a single signal. As such, one or more of blocks 3003-3006 are optional. Furthermore, it would be conceivable that the relay nodes proactively implement the discovery procedures and proactively transmit the discovery responses. As such, block 3003 is optional. Still further, it would be conceivable that the relay nodes proactively provide the link reports, e.g., according to some predefined timing. As such, block 3005 can be optional. Still further, it would be possible that there is no specific configuration required for implementing the relaying. As such, blocks 3008 and 3011 are optional. Still further, it would be possible that the communication between the first node and the second node is implemented on, both, the direct single-hop transmission path and one or more multi-hop transmission paths in a parallel manner. Hence, blocks 3001 and 3009 may be executed contemporaneously. Still further, a fallback from the multi-hop transmission path to the direct single-hop transmission path may be optional and, as such, blocks 3010 and 3011 may be optional.

Figure 5:
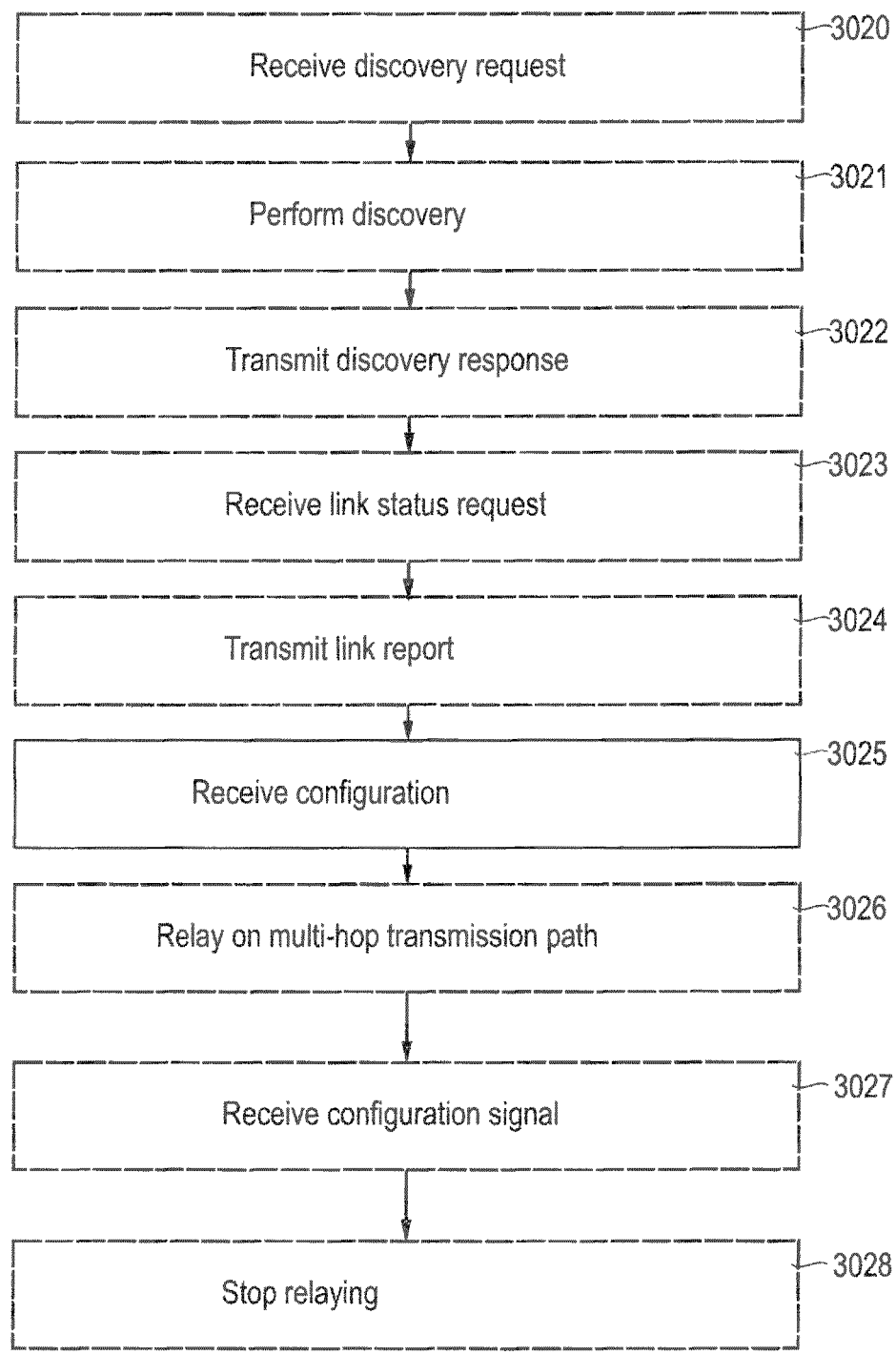
FIG. 5 is a flowchart of a method implemented by a relay node according to various examples.

FIG. 5 is a flowchart of a method according to various examples. Optional blocks are illustrated with dashed lines in FIG. 5. The method of FIG. 5 can be executed by a relay node. The relay node can relay data. For example, the relay node may be configured as the node 400 in FIG. 2; as such, the method of FIG. 5 may be executed by the processor 411 and the memory 412 of the node 400 as illustrated in FIG. 2. Specifically, it would be possible that the method of FIG. 5 is executed by the UE 103 of the network 100 as illustrated in FIG. 1.

The method of FIG. 5 is inter-related to the method of FIG. 4. As such, block 3020 is interrelated to block 3003.

At block 3021, the relay node performs a discovery procedure. This can include transmitting and/or receiving discovery signals using D2D communication or another protocol.

Block 3022 is interrelated to lock 3004. Block 3023 is interrelated to block 3005. Block 3024 is interrelated to block 3006. Block 3025 is interrelated to block 3008. Block 3026 is interrelated to block 3009.

For example, relaying in block 3026 can be relaying on layer 2 or layer 3 or layer 4 according to an Open Systems Interface (OSI) model. Relaying can include a change of the protocol of data units. For example, relaying in block 3026 can also be labelled forwarding data received from the first node towards the second node along the multi-hop transmission path.

When relaying at block 3026, the relay node may use TTRs from its resource budget associated with a DC restriction imposed on the relay node.

Block 3027 is interrelated to block 3011. Upon receiving the configuration signal in block 3027, the relay node stops relaying, block 3028.

Figure 6:
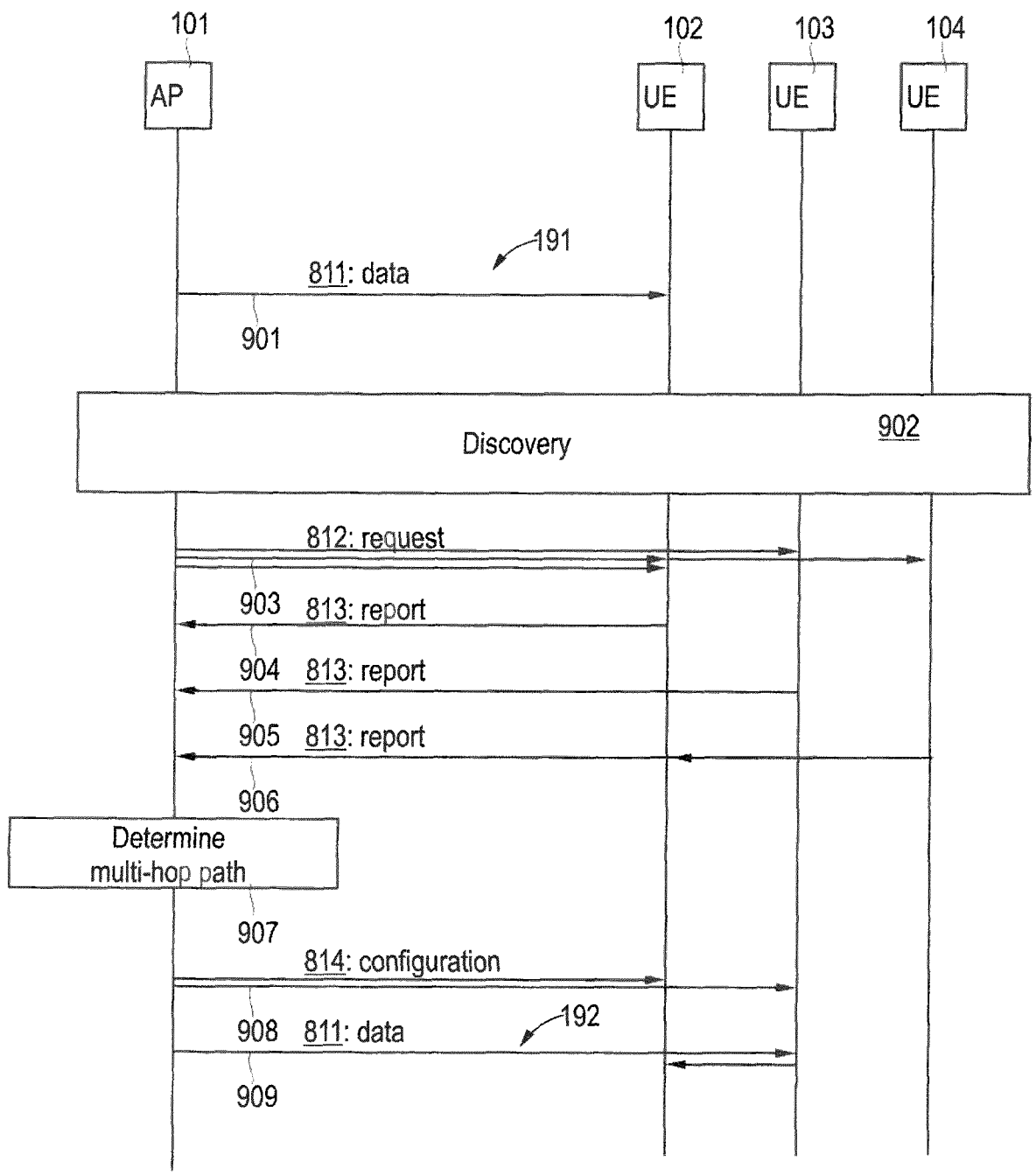
FIG. 6 is a signaling diagram illustrating communication between the multiple nodes according to various examples.

FIG. 6 is a signaling diagram of communication between the nodes 101-104 of the network 100 (cf. FIG. 1). FIG. 6 illustrates aspects of re-routing communication from the direct single-hop communication path 191 to the multi-hop communication path 192. For example, the signaling diagram of FIG. 6 can be achieved by executing the methods according to the flowcharts of FIG. 4 and FIG. 5.

Initially, at 901 data 811 is communicated from the AP 101—implementing the first node according to the method of FIG. 4—to the UE 102—implementing the relay node according to the method of FIG. 5—along the direct single-hop communication path 191 (cf. FIG. 4: block 3001 and FIG. 5: block 3021).

Figure 7:
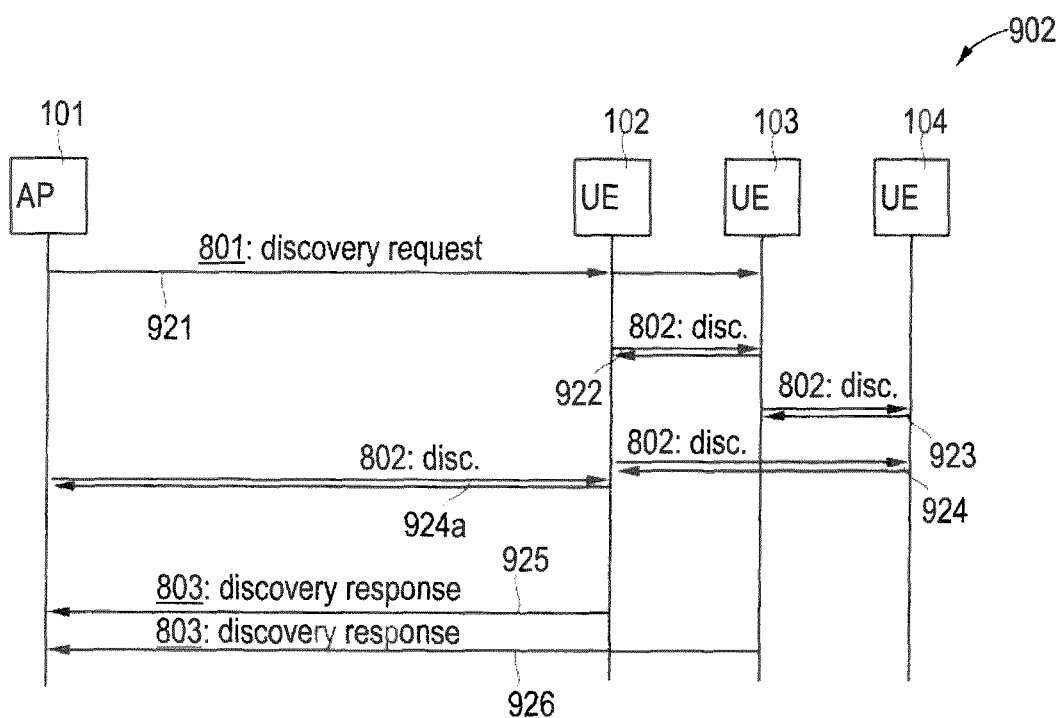
FIG. 7 is a signaling diagram illustrating communication between the multiple nodes according to various examples.

At 902, discovery of further communication links 111-115 is performed. Details with respect to the discovery are illustrated in connection with FIG. 7. Here, at 921, the AP 101 transmits a discovery request signal 801, e.g., as a broadcast (cf. FIG. 4: block 3003). The discovery request signal 801 is received by the UEs 102, 103. The UE 104 does not directly receive the discovery request signal 801, because it is out-of-range.

Then, at 922-924, 924a, discovery signals 802 are exchanged between the UEs 102-104, to thereby reveal the communication links 111-114 (cf. FIG. 1; cf. FIG. 5, block 3021).

Next, at 925 and 926, the UEs 102 and 103 transmit discovery response signals 803; the AP 101 receives the discovery response signals 803. The discovery response signals 803 are indicative of the communication links 112-114 (cf FIG. 4: block 3004 and FIG. 5: block 3022).

Then, with completed discovery, the AP 101 transmits request signals 812 to the UEs 102, 103 in range, 903 (continued reference to FIG. 6; cf. FIG. 4: block 3005 and FIG. 5: block 3023). In the example of FIG. 6, the request signal 812 is relayed by the UE 102 to the UE 104.

The UEs 102-104 then respond with report signals 813, at 904-906 (cf. FIG. 4: block 3006 and FIG. 5: block 3024). Again, the report signal 813 transmitted by the out-of-range UE 104 is relayed through the UE 102.

Then, at 907, based on one or more information elements included in the report signals 813, the AP 101 determines the multi-hop transmission path 192 (cf. FIG. 4: block 3007). Specifically, the AP 101 selects the multi-hop transmission path 192 from multiple candidate multi-hop transmission paths (e.g., in the scenario FIG. 1 an alternative multi-hop transmission path would be a long communication links 111-113-114).

Then, at 908, configuration signals transmitted by the AP 101 to the relay UE 103 and the receiving UE 102 (cf. FIG. 4: block 3008 and FIG. 5: block 3027).

This facilitates communicating along the multi-hop transmission path 192 at 909.

Summarizing, above, techniques have been described which facilitate a node such as an AP to use fewer TTRs by relaying data through communication links with better spectral efficiency. The overall system capacity can be increased. The transmitting node and the receiving node will consume less energy when communicating, due to the better spectral efficiency. The output power level can be lower and shorter packets or transmission blocks can be used. In case one or more communication links employed by one or more relay nodes employ other protocols, an additional TTR penalty can be avoided for the one or more relay nodes.

Summarizing, the following Examples have been described:

Example 1

A method, comprising:
receiving (3006) at least one report signal (813) from at least one relay node (103, 104, 400), the at least one report signal (813) being associated with a plurality of communication links (111-115) formed by a first node (101, 400), a second node (102, 400), and the at least one relay node (103, 104, 400), and
based on the at least one report signal (813) and a spectrum access restriction of a spectrum access of the first node (101, 400): determining (3007) a multi-hop transmission path (192) for communication between the first node (101, 400) and the second node (102, 400) using communication links (111, 112) selected from the plurality of communication links (111-115).

Example 2

The method of Example 1,
wherein the at least one report signal (813) is indicative of a further spectrum access restriction of spectrum access of the at least one relay node (103, 104, 400),
wherein the multi-hop transmission path (192) is determined based on the further spectrum access restriction.

Example 3

The method of Example 2,
wherein the at least one report signal (813) is indicative of at least one of activation of the further spectrum access restriction, deactivation of the further spectrum access restriction, and a balance of a budget associated with the further spectrum access restriction.

Example 4

The method of any one of the preceding Examples,
wherein the at least one report signal (813) is indicative of link statuses of the plurality of communication links (111-115),
wherein the multi-hop transmission path (192) is determined based on the link statuses.

Example 5

The method of Example 4,
wherein the link statuses comprise at least one of: a repetition level for coverage extension; a receive signal strength; a channel quality indicator; a spectral efficiency; a data rate; an interference level; a security level; an encryption; and an error rate.

Example 6

The method of any one of the preceding Examples,
wherein the at least one report signal (813) is indicative of protocol types of the plurality of communication links (111-115),
wherein the multi-hop transmission path (192) is determined based on the protocol types.

Example 7

The method of any one of the preceding Examples,
wherein the at least one report signal (813) is indicative of one or more operational device parameters of the at least one relay node (103, 104, 400), the one or more operational device parameter comprising at least one of: a mobility; a battery status; a power class; a device type; and a relaying capability; and wherein the multi-hop transmission path (192) is determined based on the one or more operational device parameters.

Example 8

The method of any one of the preceding Examples, further comprising:

monitoring (3002) fulfillment of the spectrum access restriction by a direct single-hop transmission path (191) for the communication between the first node (101, 400) and the second node (102, 400), wherein the determining of the multi-hop transmission path (192) is selectively triggered based on said monitoring of the fulfillment of the spectrum access restriction.

Example 9

The method of any one of the preceding Examples, further comprising:

transmitting (3003) a control signal to the at least one relay node (103, 104, 400), the control signal triggering discovery of the plurality of communication links (111-115), and receiving (3004) at least one response signal indicative of the plurality of communication links (111-115), wherein the multi-hop transmission path (192) is determined further based on the at least one response signal.

Example 10

The method of Example 8 and 9, wherein said transmitting (3003) of the control signal is selectively triggered based on said monitoring of the fulfillment of the spectrum access restriction.

11

The method of any one of the preceding Examples, wherein said determining of the multi-hop transmission path (192) comprises an optimization having a goal function and a constraint.

Example 12

The method of Example 11, wherein the goal function is associated with at least one of: use of transmit time resources at the first node (101, 400); use of transmit time resources at the at least one relay node (103, 104, 400); a global use of transmit time resources at all nodes along the multi-hop transmission path (192); a count of nodes along the multi-hop transmission path (192); a latency of the communication; and an amount of control signaling overhead associated with the communication.

Example 13

The method of Example 11 or 12, wherein the constraint is associated with at least one of: a balance of a budget associated with the spectrum access restriction of the first node (101, 400); and a further balance of a further budget associated with a further spectrum access restriction of the at least one relay node (103, 104, 400).

Example 14

The method of any one of the preceding Examples, wherein said determining of the multi-hop transmission path (192) is based on an estimation of an amount of required transmit time resources at the at least one relay node (103, 104, 400).

Example 15

The method of any one of the preceding Examples, wherein the first node (101, 400) is an access point of a communication network (100), and wherein the at least one relay node (103) is a wireless communication device connected to the communication network (100).

Example 16

The method of any one of the preceding Examples, further comprising:

upon determining the multi-hop transmission path (192):
transmitting, to at least one selected relay node of the at least one relay node (103, 104, 400), a configuration signal indicative of a request for relaying data along the multi-hop transmission path (192).

Example 17

A method, comprising:

a relay node (103, 400) transmitting (3024), to a node, a report signal (813), the report signal (813) being associated with a plurality of communication links (111-115) formed by the relay node and one or more further nodes, the report signal (813) being indicative of a spectrum access restriction of spectrum access of the relay node, and relaying (3027) data along a multi-hop transmission path (192) using transmit time resources from a resource budget associated with the spectrum access restriction.

Example 18

The method of Example 17, further comprising:

receiving (3020) a control signal from the node, in response to receiving the control signal: performing (3021) discovery of the plurality of communication links (111-115), and transmitting (3022) at least one response signal indicative of the plurality of communication links (111-115) to the node.

Example 19

The method of Example 17 or 18, further comprising:

receiving, from the node, a configuration signal indicative of a request for relaying data along the multi-hop transmission path (192), wherein said relaying (3027) is in response to receiving the configuration signal.

Example 20

A node (101, 400) comprising a control circuitry (411, 412) configured to:
receive (3006) at least one report signal (813) from at least one relay node (103, 104, 400), the at least one report signal (813) being associated with a plurality of communication links (111-115) formed by a first node (101, 400), a second node (102, 400), and the at least one relay node (103, 104, 400), and
based on the at least one report signal (813) and a spectrum access restriction of a spectrum access of the first node (101, 400): determine (3007) a multi-hop transmission path (192) for communication between the first node (101, 400) and the second node (102, 400) using communication links (111, 112) selected from the plurality of communication links (111-115).

Example 22

The node of Example 21,
wherein the control circuitry (411, 412) is configured to perform the method of any one of Examples 1 to 16.

Example 23

A relay node (103, 400) comprising a control circuitry (411, 412) configured to:
transmit (3024), to a node, a report signal (813), the report signal (813) being associated with a plurality of communication links (111-115) formed by the relay node and one or more further nodes, the report signal (813) being indicative of a spectrum access restriction of spectrum access of the relay node, and
relay (3027) data along a multi-hop transmission path (192) using transmit time resources from a resource budget associated with the spectrum access restriction.

Example 24

The relay node of Example 23,
wherein the control circuitry (411, 412) is configured to perform the method of any one of Examples 17 to 20.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, while various examples have been described in which the multi-hop transmission path is determined based on the DC restriction imposed on the transmitting node, this may be generally optional. For instance, it would be possible to determine the multi-hop transmission path based on one or more further DC restrictions imposed on one or more relay nodes (alternatively or additionally to considering the DC restriction imposed on the transmitting node).

For further illustration, while various examples have been described in connection with a DC restriction, similar examples may be readily applied to other kinds and types of spectrum access restrictions.

While some examples have been described in connection with a LBT procedure, the LBT procedure is generally optional.

The invention claimed is:

1. A method, comprising:
receiving at least one report signal from at least one relay node, the at least one report signal being associated with a plurality of communication links formed by a first node, a second node, and the at least one relay node,
based on the at least one report signal and a spectrum access restriction of a spectrum access of the first node: determining a multi-hop transmission path for communication between the first node and the second node using communication links selected from the plurality of communication links, and
upon determining the multi-hop transmission path: transmitting, to at least one selected relay node of the at least one relay node, a configuration signal indicative of a request for relaying data along the multi-hop transmission path.

2. The method of claim 1,
wherein the at least one report signal is indicative of a further spectrum access restriction of spectrum access of the at least one relay node,
wherein the multi-hop transmission path is determined based on the further spectrum access restriction.

3. The method of claim 2,
wherein the at least one report signal is indicative of at least one of activation of the further spectrum access restriction, deactivation of the further spectrum access restriction, and a balance of a budget associated with the further spectrum access restriction.

4. The method of claim 1,
wherein the at least one report signal is indicative of link statuses of the plurality of communication links,
wherein the multi-hop transmission path is determined based on the link statuses.

5. The method of claim 4,
wherein the link statuses comprise at least one of: a repetition level for coverage extension; a receive signal strength; a channel quality indicator; a spectral efficiency; a data rate; an interference level; a security level; an encryption; and an error rate.

6. The method of claim 1,
wherein the at least one report signal is indicative of protocol types of the plurality of communication links,
wherein the multi-hop transmission path is determined based on the protocol types.

7. The method of claim 1,
wherein the at least one report signal is indicative of one or more operational device parameters of the at least one relay node, the one or more operational device parameter comprising at least one of: a mobility; a battery status; a power class; a device type; and a relaying capability; and
wherein the multi-hop transmission path is determined based on the one or more operational device parameters.

8. The method of claim 1, further comprising:
monitoring fulfillment of the spectrum access restriction by a direct single-hop transmission path for the communication between the first node and the second node,
wherein the determining of the multi-hop transmission path is selectively triggered based on said monitoring of the fulfillment of the spectrum access restriction.

9. The method of claim 8, further comprising:
transmitting a control signal to the at least one relay node, the control signal triggering discovery of the plurality of communication links, and
receiving at least one response signal indicative of the plurality of communication links,
wherein the multi-hop transmission path is determined further based on the at least one response signal, and
wherein said transmitting of the control signal is selectively triggered based on said monitoring of the fulfillment of the spectrum access restriction.

10. The method of claim 1, further comprising:
transmitting a control signal to the at least one relay node, the control signal triggering discovery of the plurality of communication links, and
receiving at least one response signal indicative of the plurality of communication links,
wherein the multi-hop transmission path is determined further based on the at least one response signal.

11. The method of claim 1,
wherein said determining of the multi-hop transmission path comprises an optimization having a goal function and a constraint.

12. The method of claim 11,
wherein the goal function is associated with at least one of: use of transmit time resources at the first node; use of transmit time resources at the at least one relay node; a global use of transmit time resources at all nodes along the multi-hop transmission path; a count of nodes along the multi-hop transmission path; a latency of the communication; and an amount of control signaling overhead associated with the communication.

13. The method of claim 11,
wherein the constraint is associated with at least one of: a balance of a budget associated with the spectrum access restriction of the first node; and a further balance of a further budget associated with a further spectrum access restriction of the at least one relay node.

14. The method of claim 1,
wherein said determining of the multi-hop transmission path is based on an estimation of an amount of required transmit time resources at the at least one relay node.

15. The method of claim 1,
wherein the first node is an access point of a communication network, and
wherein the at least one relay node is a wireless communication device connected to the communication network.

16. A method, comprising:
a relay node transmitting, to a node, a report signal, the report signal being associated with a plurality of communication links formed by the relay node and one or more further nodes, the report signal being indicative of a spectrum access restriction of spectrum access of the relay node,
relaying data along a multi-hop transmission path using transmit time resources from a resource budget associated with the spectrum access restriction, and
receiving, from the node, a configuration signal indicative of a request for relaying data along the multi-hop transmission path,
wherein said relaying is in response to receiving the configuration signal.

17. The method of claim 16, further comprising:
receiving a control signal from the node,
in response to receiving the control signal: performing discovery of the plurality of communication links, and
transmitting at least one response signal indicative of the plurality of communication links to the node.

18. A node comprising a control circuitry configured to:
receive at least one report signal from at least one relay node, the at least one report signal being associated with a plurality of communication links formed by a first node, a second node, and the at least one relay node,
based on the at least one report signal and a spectrum access restriction of a spectrum access of the first node: determine a multi-hop transmission path for communication between the first node and the second node using communication links selected from the plurality of communication links, and
upon determining the multi-hop transmission path: transmit, to at least one selected relay node of the at least one relay node, a configuration signal indicative of a request for relaying data along the multi-hop transmission path.

19. The node of claim 18,
wherein the at least one report signal is indicative of a further spectrum access restriction of spectrum access of the at least one relay node,
wherein the multi-hop transmission path is determined based on the further spectrum access restriction.

20. The node of claim 19,
wherein the at least one report signal is indicative of at least one of activation of the further spectrum access restriction, deactivation of the further spectrum access restriction, and a balance of a budget associated with the further spectrum access restriction.

* * * * *